MAGNETIC CORE SCANNING CIRCUITRY
Filed Feb. 18, 1969
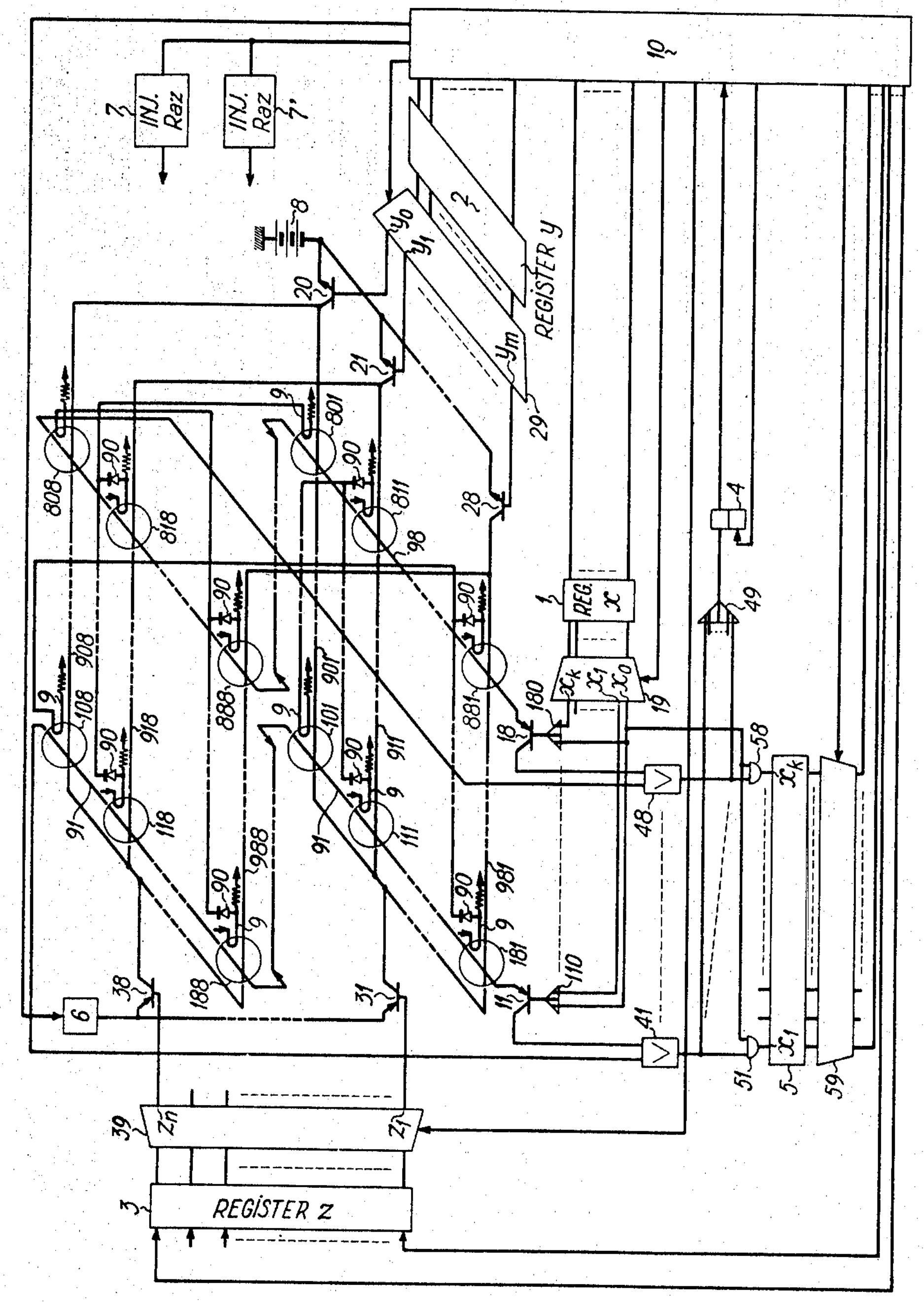
INVENTORS:
Pierre M. LUCAS, Jean F. DUQUESNE,
Roger L. COURTOIS, Charles E. ABRAHAM
By: Abraham A. Saffitz
ATTORNEY United States Patent Office 3,566,377

Patented Feb. 23, 1971

3,566,377
MAGNETIC CORE SCANNING CIRCUITRY

Pierre M. Lucas, 20 Rue Tariel, Issy-les-Moulineaux 92, France; Jean F. Duquesne, 120 Rue de Javel, Paris 75, France; Roger L. Courtois, 65 Ave. Paul Vaillant Couturier, Gentilly 94, France; and Charles E. Abraham, 114 Elysees II, La Celle-Saint-Cloud 78, France Filed Feb. 18, 1969, Ser. No. 800,047
Claims priority, application France, Feb. 20, 1968, 140,585
Int. Cl. G11c *5/02, 11/06;* G01r *19/16*
U.S. Cl. 340—174 3 Claims

ABSTRACT OF THE DISCLOSURE

Scanning device for testing the states of a large number of external electrical circuits which have an operative and an inoperative state. The device comprises a tridimensional cubic matrix of rectangular hysteresis loop magnetic cores, ones called individual cores which are connected to the external electrical circuits and the other called group cores which are connected in parallel to a plurality of external electrical circuits. Each group core corresponds to a line of individual cores and a line of group cores corresponds to a plane of individual cores. There is a correlation between two of the coordinates of a group core (the third coordinate being constant) and the two coordinates defining the corresponding line of individual cores. Means are provided for reading-out a line of group cores and registering the coordinates of those of the group cores of the line which are operating and then for reading-out the lines of individual cores defined by the coordinates correlated to the coordinates of the operating group cores.

The invention relates to scanning circuitry by means of which it is possible to check whether any one of a number of circuits is passing current or not; and more particularly concerns improvements in electrical scanning circuitry for a three-dimensional matrix composed of parallel planes of toroidal magnetic cores each having a rectangular hysteresis cycle.

Magnetic core three-dimensional matrices are known in the prior art. In these matrices, each core has four windings, one magnetisation winding which holds the core in one of its saturation states when the associated electrical circuit has passing through it the current which is to be detected, two control windings, one of which is a return-to-zero winding for initiating triggering of the core in the same direction as the magnetisation winding, and the second of which is an interrogation winding for initiating triggering of the core in the opposite direction if it is not held saturated by the magnetisation winding, and finally a reading winding. The windings for return-to-zero and interrogation are connected in series respectively in accordance with a first and a second coordinate, and the reading windings are connected in series in accordance with a third coordinate. Such a scanner in which the control currents for return-to-zero and interrogation are supplied by a single current injector and pass respectively through all the cores of two perpendicular planes of the matrix, functions completely satisfactorily only for a relatively low capacity. Moreover, the searching for a circuit carrying current, such as a loop current of a telephone line, is relatively slow since it is carried out by individual successive tests of all the circuits which it serves.

In accordance with the present invention there is provided scanning circuitry for a three-dimensional parallel plane matrix of magnetic core memory elements having a rectangular hysteresis cycle, such circuitry including group magnetic core memory elements, each connected to a group of the former memory elements and brought into operation when at least one of the elements of the group is operative. Thus when a group core is operative, it can be deduced therefrom than at least one memory element of the group is itself operative.

More precisely, the invention concerns a scanning device for testing the states of a large number of external electrical circuits having an operative and an inoperative state. It comprises a tridimensional matrix of individual cores and group cores having a rectangular hysteresis loop and arranged in several planes, and in each plane along lines and columns. The individual cores are defined by three variables coordinates $x$, $y$, $z$ and the group cores are defined by a constant coordinate $Y_0$ and two variable coordinates X, Z. Each individual core is associated with a single external electrical circuit and each group core is associated with a group of external electrical circuits. Each group core corresponds to a line of individual cores and a line of group cores corresponds to a plane of individual cores through a correlation between the two variable coordinates X, Z of a group core and the two coordinates $y$, $z$ defining a line of individual cores. The correlation relationship may be for example:

$$y=Z \qquad z=X$$

Means are provided for reading-out a line of group cores, registering the coordinates of those of the group cores of said line which are brought into operation by the external electrical circuits associated thereto and for reading-out the lines of individual cores defined by the coordinates correlated with the coordinates of the operative group cores.

The invention will be better understood on reading the following description of one embodiment diagrammatically illustrated in the accompanying drawing showing an arrangement of a scanner of electrical circuits with a three-dimensional matrix memory utilizing parallel planes of toroidal cores.

The matrix shown in the drawing comprises $n$ levels $z_1$ to $z_n$ of cores referenced at each level by their coordinates $x_1$ to $x_k$ and $y_0$ to $y_m$. To avoid mixing letters and numbers in the referencing of the cores, each of them is designated by the value of its three coordinates, $x$, $y$, $z$, in order, the number 8 being used conventionally to designate the highest value that each of them may take. The cores are magnetic rings or toroids having a rectangular hysteresis cycle and provided with four windings, as explained above. To avoid encumbering the drawing, the aforementioned return-to-zero winding has not been shown.

The selection of a core is made by a computer 10 by means of three registers of coordinates, one register 1 for the coordinate $x$, one register 2 for the coordinate $y$ and one register 3 for the coordinate $z$. Register 1 for the coordinate $x$ controls by means of a decoder 19, a number $k$ of p-n-p type transistors referenced 11 to 18, each of which, when it passes current, closes and connects a reading circuit, respectively 91 to 98, common to all the cores of the same coordinates $x$ to the terminals of an associated read-out amplifier, respectively 41 to 48. For instance, the outlet $x_1$ of the decoder 19 is connected by an "OR" gate 110 to the base of the transistor 11, the collector of which is connected to one input of the amplifier 41 and the emitter to one end of the reading circuit 91 which connects in series the reading windings of the cores such as 181 . . . 111, 101, 188 . . . 118, 108 to the second input of the amplifier 41. In the same way, the outputs $x_k$ of the decoder 19 control by means of an "OR" gate 180 the transistor 18 which completes a reading circuit 98 common to the cores 881 . . . 811, 801, 888 . . . 818, 808 at the terminals of the amplifier 48. Moreover, the decoder 19 is provided with an output $x_0$ which is connected to the second inputs of all the "OR" gates such as 110 and 180.

The $y$ coordinate register 2 controls by means of a decoder 29, a number $(m+1)$ of n-p-n type transistors 20 to 28, each of which, when it is passing current, connects to a source 8 of negative potential a point common to those interrogation circuits which connect in series the interrogation windings of the same coordinates $y$ in each plane of coordinates $z_1$ to $z_n$. For instance, the output $y_0$ of the decoder 29 is connected to the base of the transistor 20, the emitter of which is connected to the negative terminal of the source 8 and the collector to the common point of the interrogation circuits 901 to 908 in the plane $y_0$, the first of which connects in series the interrogation windings of the cores such as 101 . . . 801 of coordinate $y_0$ in the plane $z_1$ and the last of which connects in series the interrogation windings of the cores 108 . . . 808 of coordinate $y_0$ in the plane $z_n$. In the same way the output $y_1$ of the decoder 29 controls the transistor 21 which connects to the source 8 the point common to the interrogation circuits 911 to 918 in the plane $y_1$ of the core lines such as 111 . . . 811, and 118 . . . 818 respectively. Finally, the output $y_m$ controls by means of the transistor 28 the interrogation circuits 981 to 988 of the lines of cores such as 181 . . . 881 and 188 . . . 888, respectively.

The $z$ register 3 controls by means of a decoder 39 a number $n$ of p-n-p type transistors 31 to 38, each of which when it passes current, connects to a current injector 6 the interrogation windings of all the cores of the same coordinate $z$. For instance, the transistor 31, the base of which is connected to the output $z_1$ of the decoder 39, has its emitter connected to the output of the current injector 6 and its collector connected to the point common to the interrogation circuits such as 901, 911 . . . 981 which connect in series the cores of the different coordinates $y_0$ to $y_m$, for instance such as 181 . . . 881 as regards $y_m$, or 111 . . . 811 as regards $y_1$, or 101 . . . 801 as regards $y_0$, in the plane $z_1$. In the same way, the transistor 38 controlled by the output $z_n$ of the decoder 39 connects to the current injector 6 the point common to the interrogation circuits such as 908, 918 . . . 988 of the lines of cores such as 108 . . . 808 or 118 . . . 818 or 188 . . . 888.

The return-to-zero of all the cores, which is controlled before each interrogation, is carried out by means of one or several current injectors such as 7, 7'.

All the cores of coordinates $y_1$ to $y_m$ are individually allotted to an electrical circuit, for instance to a telephone line, to show the state of its loop, and their magnetisation winding 9 is at one end connected to this circuit and at its other end, connected to a point of predetermined potential, for instance to the negative terminal of a source of direct current, by means of a resistor.

All the cores of coordinate $y_0$, such as 101 . . . 801, 108 . . . 808 are group cores each of which is allotted to a line of cores of coordinates $y_1$ to $y_m$ and $z_1$ to $z_n$. The magnetisation circuit of each group core is connected in parallel to the magnetisation circuits 9 of the cores of a given line, these being decoupled from each other by diodes 90. For instance, each of the cores of coordinates $y_1$ and $z_1$ such as 111 . . . 811 has a first end of its magnetisation winding connected to an electrical circuit to be tested and the second end of said magnetisation winding connected by a diode 90 to one end of the magnetisation winding 9 of the group core 101 and by a resistor to the point of fixed potential. The second end of the magnetisation winding of the group core 101 is connected by a resistor to the same point of fixed potential as for the individual cores. In the same way the group core 801 has its magnetisation winding 9 connected by the decoupling diodes to the magnetisation windings of the cores such as 118 . . . 818 which form the line $y_1$ of the plane $z_n$. The group core 108 is connected to the individual cores such as 181 . . . 881, which form the line $y_m$ of the plane $z_1$ and the group core 808 is connected to the cores such as 188 . . . 888 which form the line $y_m$ of the plane $z_n$. If one assumes $k=m=n$, the arrangement is such that, to the planes $y_1$ to $y_m$ of individual cores are respectively associated the lines of group cores of the levels $z_1$ to $z_n$.

The amplifiers 41 to 48 have their outputs connected by means of an "OR" gate 49 to an input of a flip-flop 4, and also by "AND" gates 51 to 58, to the memory elements of an output register 5 with which is associated a coder 59 connected to the computer 10. The second inputs of gates 58–58 are connected to the outlet $x_0$ of the decoder 19.

In order to know the state of a determined circuit, the computer 10 applies by means of the injectors 7, 7' a first pulse for return-to-zero to all the cores of the matrix, writes in the registers 1, 2 and 3 the coordinates $x$, $y$, $z$ of the individual core associated with this circuit and applies simultaneously an unblocking pulse to the decoders 19, 29, 39. The unblocking pulse unblocks that out of the transistors 11 to 18, 21 to 28, and 31 to 38 which is selected by the associated register. At the same time a control pulse is applied to the current injector 6 by the computer. A direct current having a direction suitable for resetting all the cores except those which are held by currents from the tested electrical circuits, flows from the injector 6 to the source 8 through that of the transistors 31 to 38 which is conducting, an interrogation circuit such as 911 . . . 981, 918 . . . 988 and that of the transistors 21 to 28 which is conducting. For instance, the interrogation current passes through the transistor 38, through the interrogation circuit 918 passing through the interrogation windings of cores 118 . . . 818 and the transistor 21. If the core of this line designated by the coordinate $x$ comprised between $x_1$ and $x_k$, for instance the core 818, is not held in its operated state by the current to be detected in the associated electrical circuit, it changes over, and a pulse is transmitted through the transistor 18 which is passing, the amplifier 48 and the gate 49 to the "one" input of flip-flop 4. The computer 10 receives this information and derives therefrom the availability of the tested circuit. Then it resets flip-flop 4. If the current to be detected flows through the circuit associated with the core interrogated, the core does not change over and flip-flop 4 remains in the "zero" state.

It results from the above explanations that, to a plane of individual cores corresponds a line of group cores and to a line of individual cores corresponds a single group core. The correlation is the following:

To the plane $y=1$ corresponds the line $y=0$; $z=1$
To the plane $y=p$ corresponds the line $y=0$; $z=p$
To the line $y=1$; $z=1$ corresponds the group core $z=1$; $y=0$; $z=1$
To the line $y=p$; $z=q$ corresponds the group core $x=q$; $y=0$; $z=p$ Thus in the correlation, the level $z$ of the group cores corresponding to a plane of individual cores is equal to the ordinate $y$ of this plane and the abscissa $x$ of the group core corresponding to a line of individual cores is equal to the level $z$ of this line.

In cyclic exploitation of the scanner, the computer 10 controls a general return-to-zero of all the cores at the beginning of each cycle and carries out a scanning by successive planes $y$ of individual cores of the matrix. Scanning the individual cores per plane corresponds to scanning the group cores per lines. The address $x_0$ is recorded in register 1, the address $y_0$ in the register 2 and the addresses $z_1$ to $z_n$ successively in the register 3. The group cores of the planes $z_1$ to $z_n$, such as those referenced 101 . . . 801 in the plane $z_1$ and 108 . . . 808 in the plane $z_n$ are thus interrogated by lines and, the transistors 11 to 18 all being conducting, the coordinate $x$ of each of the operated group cores interrogated is read-out. The writing-in is performed in register 5 by means of the gates 51 to 58 which at this time are open by a signal at the outlet $x_0$ of register 19. After each interrogation of a line of group cores, the computer 10 applies to the decoder 59 read-out pulses which have the effect of causing it to transmit successively the abscissae $x$ of the group cores in operation in the interrogated line. If none of the group cores of the line is in operation the coordinate $z$ is increased by one unit and a fresh line of group cores is interrogated.

If at least one of the group cores of the line interrogated is in operation, the coordinate $z$ of the line of group cores is transferred by the computer 10 to the $y$-register 2, marking an ordinate $Y=z$ and the coordinate $x$ of the operated group core is transferred by the computer to the $z$-register 3, marking a level $Z=x$. At the same time, the register 5 is reset and a scanning is done of the individual cores of the line of coordinates Y and Z, the register 1 remaining at the position $x_0$. The coordinates X of the individual cores the operation state of which had brought about the operation of a group core, is registered in the register 5 and transmitted by the coder 59 to the computer 10 as a reply to a pulse sent by the latter.

What we claim is:

1. Scanning device for testing the states of a large number of external electrical circuits each having an operative and an inoperative state, comprising a three dimensional matrix of bistable individual elements and bistable group elements, said individual elements being arranged in several planes defined by first coordinate addresses and within said planes in individual element lines defined by second coordinate addresses and individual element columns defined by third coordinate addresses and said group elements being arranged in a single plane having a predetermined first coordinate address and within said single plane in group element lines defined by second coordinate addresses and group element columns defined by third coordinate addresses, means in said individual elements associated with said external electrical circuits for inhibiting said individual elements from changing over when the external electrical circiuts associated thereto are operative, means connected in parallel to the inhibiting means of the individual elements of a given line in a given plane for inhibiting a group element having as its second coordinate address the first coordinate address of said given individual element plane and as its third coordinate address the second coordinate address of said given individual element line, means for reading-out a group element line, means for marking the third coordinate addresses of the group elements which are prevented from changing over by their associated inhibiting means and means for successively reading-out the individual element lines having as their common first coordinate address the second coordinate address of the read-out group element line and as their second coordinate addresses the third coordinate addresses marked by said marking means.

2. Scanning device as set forth in claim 1 in which the bistable individual elements and the bistable group elements are magnetic cores having a rectangular hystereses loop.

3. Scanning device for testing the states of a large number of external electrical circuits having an operative and an inoperative state comprising a tridimensional matrix of individual cores and group cores having a rectangular hystereses loop, arranged in several planes and in each plane along lines and columns and respectively defined by three variable coordinates and by a constant and two variable coordinates, said individual cores being respectively connected to a single external electrical circuit and said group cores being respectively connected in parallel to a plurality of external electrical circuits, each group core corresponding to a line of individual cores and a line of group cores corresponding to a plane of individual cores through a correlation between the two variable coordinates of a group core and the two coordinates defining a line of individual cores, means for reading-out a line of group cores, means for registering the coordinates of those of the group cores of said line which are brought into operation by the external electrical circuits connected thereto and means for reading-out the lines of individual cores defined by the coordinates correlated with the coordinates of the operative group cores.

References Cited

FOREIGN PATENTS 1,175,944 1/1970 Great Britain ------ 179—18.6A

JAMES W. MOFFITT, Primary Examiner

U.S. Cl. X.R.

179—18; 324—34